United States Patent
Lee et al.

(10) Patent No.: US 10,114,479 B2
(45) Date of Patent: Oct. 30, 2018

(54) ELECTRONIC DEVICE AND METHOD FOR CONTROLLING DISPLAY

(71) Applicant: Samsung Electronics Co., Ltd., Suwon-si, Gyeonggi-do (KR)

(72) Inventors: Woo-Yong Lee, Hwaseong-si (KR); Jae-Sook Joo, Seongnam-si (KR); Yeon-Gi Jin, Seoul (KR); Yong-Jin Kwon, Suwon-si (KR); Byung-Wook Kim, Anyang-si (KR); Eun-Ju Lee, Seoul (KR); Yun-Jung Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 765 days.

(21) Appl. No.: 14/619,467

(22) Filed: Feb. 11, 2015

(65) Prior Publication Data
US 2015/0241995 A1     Aug. 27, 2015

(30) Foreign Application Priority Data
Feb. 21, 2014  (KR) ........................ 10-2014-0020896

(51) Int. Cl.
| G06F 3/00 | (2006.01) |
| G06F 3/0346 | (2013.01) |
| G06F 3/0484 | (2013.01) |
| G06F 3/0481 | (2013.01) |

(52) U.S. Cl.
CPC .......... *G06F 3/0346* (2013.01); *G06F 3/0481* (2013.01); *G06F 3/04845* (2013.01)

(58) Field of Classification Search
CPC ...... G06F 3/0346; G06F 3/04845; G06F 3/01; G09G 5/32; G09G 5/34
See application file for complete search history.

(56) References Cited

U.S. PATENT DOCUMENTS

| 2012/0050259 A1* | 3/2012 | Solomonov ........... G06T 15/005 345/419 |
| 2013/0007603 A1* | 1/2013 | Dougherty .............. G06T 11/60 715/251 |
| 2013/0268882 A1* | 10/2013 | Roh ...................... G06F 1/1626 715/782 |

FOREIGN PATENT DOCUMENTS

KR   10-2013-0108952 A   10/2013

* cited by examiner

*Primary Examiner* — Haoshian Shih
(74) *Attorney, Agent, or Firm* — Jefferson IP Law, LLP

(57) ABSTRACT

An electronic device and a method for controlling a display are provided. The method includes sensing, via the electronic device, a rotation of the electronic device, identifying, by the electronic device, at least one layer having direction information that is different from a direction of the sensed rotation among a plurality of layers included in an application, changing, via the electronic device, a direction of the identified at least one layer to a direction corresponding to the sensed rotation, and displaying, via the electronic device, the application including the changed at least one layer.

27 Claims, 9 Drawing Sheets

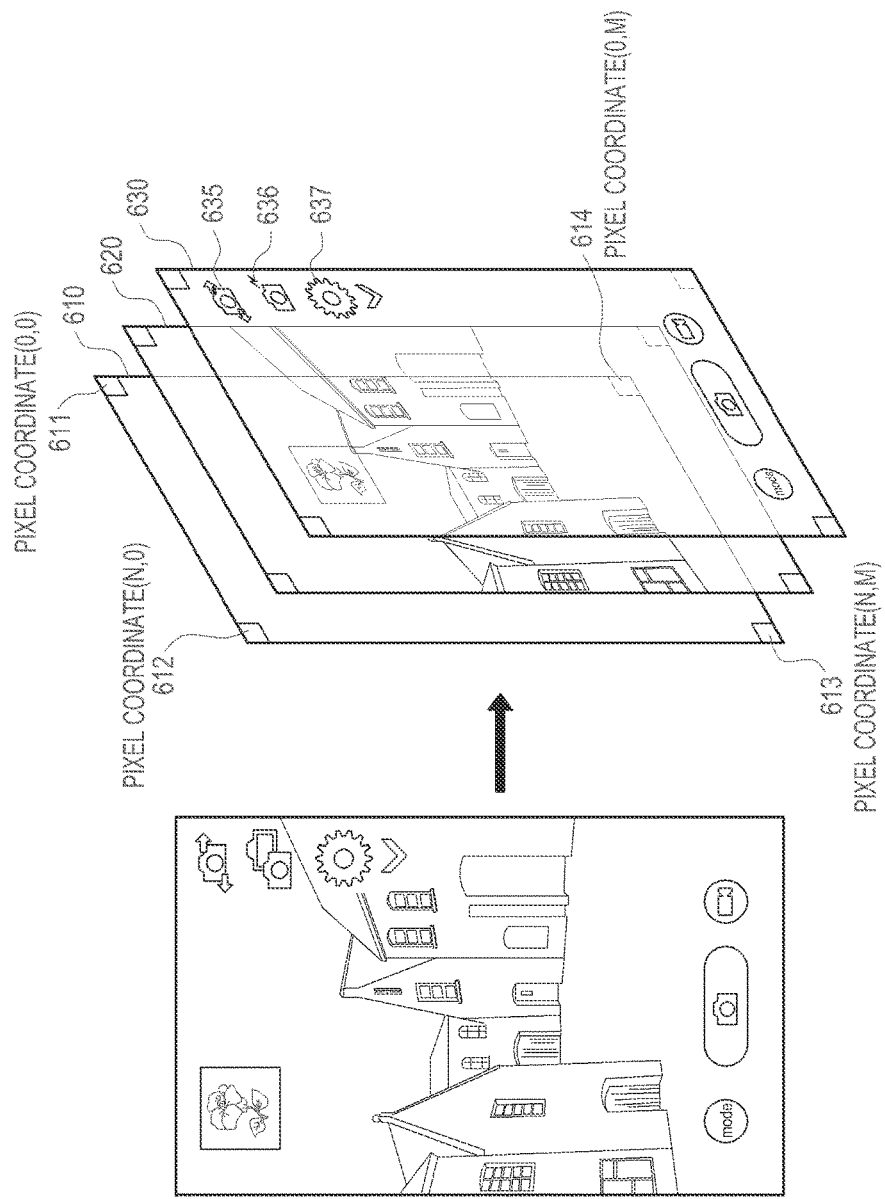

ELECTRONIC DEVICE AND METHOD FOR CONTROLLING DISPLAY

CROSS-REFERENCE TO RELATED APPLICATION(S)

This application claims the benefit under 35 U.S.C. § 119(a) of a Korean patent application filed on Feb. 21, 2014 in the Korean Intellectual Property Office and assigned Serial number 10-2014-0020896, the entire disclosure of which is hereby incorporated by reference.

TECHNICAL FIELD

The present disclosure relates to an electronic device and a method for controlling a display.

BACKGROUND

Various services and additional functions provided by an electronic device have been gradually expanded. In order to increase an effective value of the electronic device and meet various demands of users, various applications which can be executed by the electronic device have been developed.

Further, various Operating Systems (OSs) have been provided by companies manufacturing electronic devices and various applications which can be executed according to the various OSs that have been developed. In general, the applications may generate activities when the electronic device lies vertically and horizontally, respectively and switch the activity to be appropriate for a rotation of the electronic device, or some of the applications may generate an activity to use in a fixed position (for example, electronic device in a landscape mode).

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

When an electronic device uses each of activities according to a rotation mode of the electronic device, a preview image is cut off due to a change according to a rotation of the electronic device in an application such as a camera application outputting a continuous preview image.

Further, when an electronic device configures the camera application to be used in a fixed position, the user may feel inconvenience in viewing since a system window (for example, popup, quick panel, system dialogue toast message or the like) is dependent on the application configured to be used in the fixed position even though the preview image is not cut off.

Accordingly, it is required to adaptively rotate the system window in response to rotations of various applications rotated according to the rotation of the electronic device.

Accordingly, an aspect of the present disclosure is to provide an electronic device and a method for controlling a display of an electronic device.

In accordance with an aspect of the present disclosure, a method for controlling a display of an electronic device is provided. The method including sensing, via an electronic device, a rotation of the electronic device, identifying at least one layer having direction information that is different from a direction of the sensed rotation among a plurality of layers included in an application, changing a direction of the identified at least one layer to a direction corresponding to the sensed rotation, and displaying the application including the changed at least one layer.

In accordance with another aspect of the present disclosure, a method for controlling a display of an electronic device is provided. The method including recognizing, via the electronic device, at least one layer of which a direction is configured independently from an application among a plurality of layers corresponding to the application, if a direction of the at least one layer does not match a direction of the application, changing a coordinate of the at least one layer based on a coordinate of the application, and displaying the application based on the change.

In accordance with another aspect of the present disclosure, an electronic device controlling a display is provided. The electronic device including a screen configured to display an application, a sensor module configured to include at least one sensor that senses a rotation of the electronic device and a display controlling module configured to identify at least one layer having direction information that is different from the sensed rotation among a plurality of layers included in the displayed application in response to the rotation of the electronic device and to change a direction of the identified at least one layer to a direction corresponding to the sensed rotation.

In accordance with another aspect of the present disclosure, a non-transitory computer-readable recording medium having a program recorded thereon is provided. The program being for controlling a display of the electronic device and causing a computer to execute a method including sensing a rotation of the electronic device, identifying at least one layer having direction information that is different from a direction of the sensed rotation among a plurality of layers included in an application, changing a direction of the identified at least one layer to a direction corresponding to the sensed rotation, and displaying the application including the changed at least one layer.

According to the present disclosure, the user can receive convenience through an electronic device and a method for controlling a display.

Further, according to the present disclosure, it is possible to provide comfortable use to the user by changing a layer of at least one layer having direction information different from the rotation of the electronic device to a direction corresponding to the rotation of the electronic device among layers included in the application.

Moreover, the present disclosure can resolve the viewing inconvenience felt by the user by matching a coordinate of the system window or the toast message provided by the electronic device with a coordinate of the application.

In addition, a system load of the electronic device can be reduced and an entry speed of the application can be increased by providing a seamless view without cutting off an image such as the preview image of the camera application.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6A illustrates an example where a preview image is displayed in a camera application according to an embodiment of the present disclosure;

FIG. 6B illustrates an example where a plurality of layers are included in a camera application according to an embodiment of the present disclosure;

Throughout the drawings, it should be noted that like reference numbers are used to depict the same or similar elements, features, and structures.

DETAILED DESCRIPTION

Figure 1:
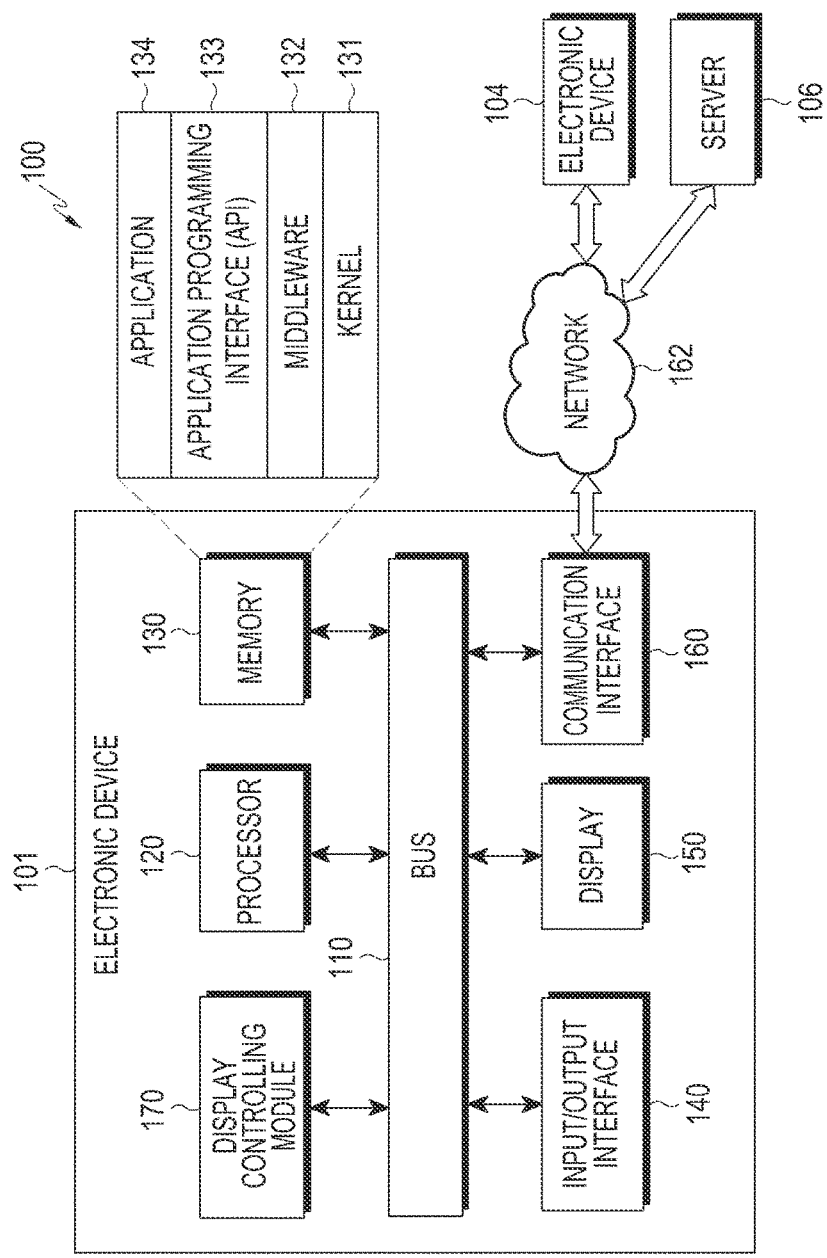
FIG. 1 illustrates a network environment including an electronic device according to an embodiment of the present disclosure.

The following description with reference to the accompanying drawings is provided to assist in a comprehensive understanding of embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expression "include" or "may include" refers to existence of a corresponding function, operation, or element, and does not limit one or more additional functions, operations, or elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween.

The terms used in the present disclosure are only used to describe specific embodiments, and are not intended to limit the present disclosure. Singular forms are intended to include plural forms unless the context clearly indicates otherwise.

Unless defined otherwise, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to the present disclosure may be a device including a display control function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic accessory, an electronic tattoo, and a smart watch).

According to some embodiments, the electronic device may be a smart home appliance with a display control function. The smart home appliance as an example of the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to some embodiments, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, electronic equipment for a ship (for example, navigation equipment for a ship, a gyro compass and the like), avionics, a security device, a head unit for a vehicle, an industrial or home robot, an Automatic Teller Machine (ATM) of a financial institution, and a Point Of Sales (POS) device of a shop.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a display control function. The electronic device according to the present disclosure may be one or a combination of the above described various electronic devices. Also, the electronic device according to the present disclosure may be a flexible device. It is obvious to those skilled in the art that the electronic device according to the present disclosure is not limited to the aforementioned devices.

The expressions "1", "2", "first", and "second" used in the present disclosure may modify various components of the present disclosure but do not limit the corresponding components. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the present disclosure.

Also, the electronic device according to the present disclosure may be a flexible device. It is obvious to those skilled in the art that the electronic device according to the present disclosure is not limited to the aforementioned devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

FIGS. 1 through 8, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure.

FIG. 1 illustrates a network environment including an electronic device according to an embodiment of the present disclosure.

Referring to FIG. 1, a network environment 101 including an electronic device 101 is illustrated. The electronic device 101 may include a bus 110, a processor 120, a memory 130, an input/output interface 140, a display 150, a communication interface 160, and a display controlling module 170.

The bus 110 may be a circuit connecting the above described components and transmitting communication (for example, a control message) between the above described components.

The processor 120 may receive commands from other components (for example, the memory 130, the input/output interface 140, the display 150, the communication interface 160, and the display controlling module 170) through the bus 110, analyze the received commands, and execute calculation or data processing according to the analyzed commands.

The memory 130 may store commands or data received from the processor 120 or other components (for example, the input/output interface 140, the display 150, the communication interface 160 and the display controlling module 170) or generated by the processor 120 or other components. The memory 130 may include programming modules, for example, a kernel 131, middleware 132, an Application Programming Interface (API) 133, or an application 134. Each of the above described programming modules may be configured by software, firmware, hardware, or a combination of two or more thereof.

The kernel 131 may control or manage system resources (for example, the bus 110, the processor 120, or the memory 130) used for executing an operation or function implemented by the remaining other programming modules, for example, the middleware 132, the API 133, or the application 134. Further, the kernel 131 may provide an interface through which the middleware 133, the API 134, or the application 134 may access individual components of the electronic device 101 to control or manage the components.

The middleware 132 may perform a relay function to allow the API 133 or the application 134 to communicate with the kernel 131 to exchange data. Further, in operation requests received from the applications 134, the middleware 132 may control (for example, scheduling or load balancing) the operation requests by using a method of assigning a priority, by which system resources (for example, the bus 110, the processor 120, the memory 130 and the like) of the electronic device 101 can be used, to at least one of the applications 134.

The API 133 is an interface by which the application 134 can control a function provided by the kernel 131 or the middleware 132 and may include, for example, at least one interface or function for a file control, a window control, image processing, or a character control.

According to various embodiments, the application 134 may include a Short Message Service (SMS)/Multimedia Messaging Service (MMS) application, an email application, a calendar application, an alarm application, a health care application (for example, application measuring a quantity of exercise or blood sugar) or an application (for example, application providing information on pressure, humidity or temperature). Additionally or alternatively, the application 134 may be an application related to an information exchange between the electronic device 101 and an external electronic device (for example, electronic device 104). The application related to the information exchange may include, for example, a notification relay application for transferring particular information to the external electronic device or a device management application for managing the external electronic device.

For example, the notification relay application may include a function of transmitting notification information generated by another application (for example, SMS/MMS application, email application, health care application or environment information application) of the electronic device 101 to the external electronic device (for example, electronic device 104). Additionally or alternatively, the notification relay application may receive notification information from, for example, the external electronic device (for example, electronic device 104) and provide the received notification information to the user. The device management application may manage (for example, install, remove, or update) at least a part of functions (for example, turning on/off the external electronic device (or some components of the external electronic device) or controlling a brightness of the display) of the external electronic device (for example, electronic device 104) communicating with the electronic device 101, an application executed in the external electronic device, or a service (for example, call service or message service) provided by the external electronic device.

According to various embodiments, the application 134 may include an application designated according to an attribute (for example, type of electronic device) of the external electronic device (for example, electronic device 104). For example, when the external electronic device is an MP3 player, the application 134 may include an application related to music reproduction. Similarly, when the external electronic device is a mobile medical device, the application 134 may include an application related to health care. According to an embodiment, the application 134 may include at least one of an application designated to the electronic device 101 and an application received from an external electronic device (for example, server 106 or electronic device 104).

The input/output interface 140 may transmit a command or data input from the user through an input/output device (for example, sensor, keyboard, or touch screen) to the processor 120, the memory 130, the communication interface 160, or the display controlling module 170 through, for example, the bus 110. For example, the input/output interface 140 may provide data on a user's touch input through a touch screen to the processor 120. The input/output interface 140 may output a command or data received, through, for example, the bus 110, from the processor 120, the memory 130, the communication interface 160, or the display controlling module 170 through the input/output device (for example, speaker or display). For example, the input/output interface 140 may output voice data processed through the processor 120 to the user through the speaker.

The display 150 may display various pieces of information (for example, multimedia data or text data) for the user.

The communication interface 160 may connect communication between the electronic device 101 and the external device (for example, electronic device 104 or server 106). For example, the communication interface 160 may access a network 162 through wireless or wired communication to communicate with the external device. The wireless communication may include at least one of, for example, WiFi, BlueTooth (BT), Near Field Communication (NFC), a Global Positioning System (GPS), and cellular communication (for example, LTE, LTE-A, CDMA, WCDMA, UMTS, WiBro or GSM). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the network 162 may be a telecommunication network. The telecommunication network may include at least one of a computer network, Internet, Internet of Things, and a telephone network. According to an embodiment, a protocol (for example, transport layer protocol, data link layer protocol, or physical layer protocol) for the communication between the electronic device 101 and the external device may be supported by at least one of the application 134, the application programming interface 133, the middleware 132, the kernel 131, and the communication interface 160.

The display controlling module 170 may process at least a part of information obtained from other components (for example, processor 120, memory 130, input/output interface 140, or communication interface 160) and provide the processed information to the user in various ways. For example, the display controlling module 170 may control at least some of the functions of the electronic device 101 by using the processor 120 or independently from the processor 120 such that the electronic device 101 interworks with another electronic device (for example, electronic device 104 or server 106). Additional information on the display controlling module 170 will be provided through FIGS. 2 to 8 below.

Hereinafter, the present disclosure will be described with reference to the accompanying drawings. The present disclosure may have various modifications and embodiments and thus will be described in detail with reference to specific embodiments illustrated in the drawings. However, it should be understood that there is no intent to limit the present disclosure to the particular forms disclosed, but on the contrary, the present disclosure is to cover all modifications, equivalents, and/or alternatives falling within the spirit and scope of the disclosure. In description of the drawings, similar elements are indicated by similar reference numerals.

Figure 2:
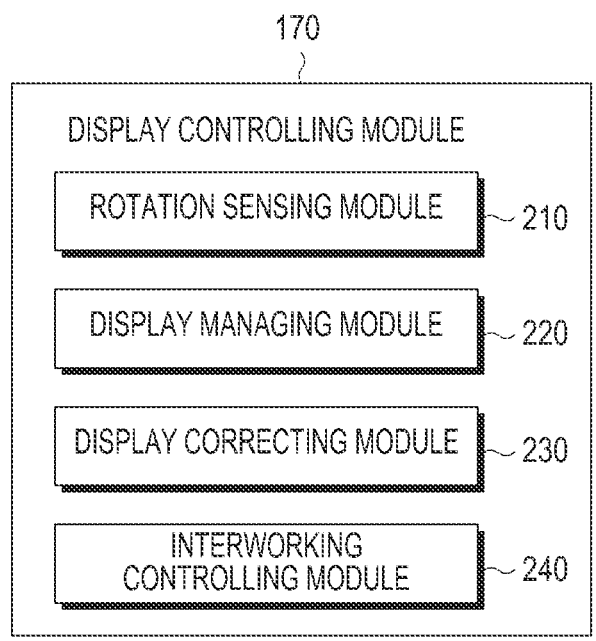
FIG. 2 is a block diagram of a display controlling module of an electronic device according to an embodiment of the present disclosure.

FIG. 2 is a block diagram of a display controlling module of an electronic device according to an embodiment of the present disclosure.

Referring to FIG. 2, a display controlling module 170 is illustrated. The display controlling module 170 may include a rotation sensing module 210, a display managing module 220, a display correcting module 230, and an interworking controlling module 240.

Figure 8:
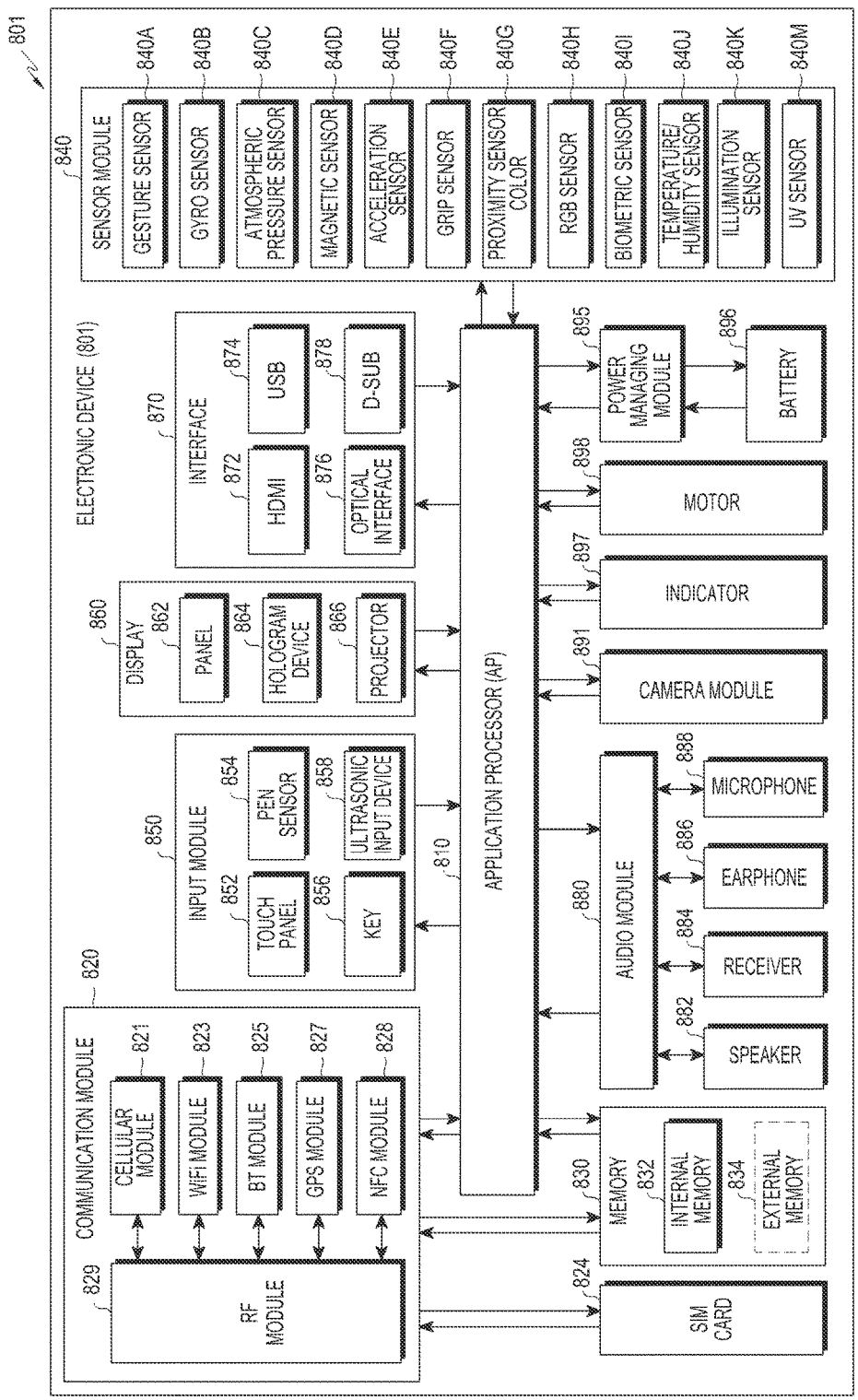
FIG. 8 is a block diagram of an electronic device according to various embodiments of the present disclosure.

According to an embodiment, the rotation sensing module 210 may sense a rotation of the electronic device 101. The rotation sensing module 210 may sense an inclined direction of the electronic device 101. Further, the rotation sensing module 210 may receive information on the rotation or the inclined direction of the electronic device 101 through at least one sensor included in a sensor module 840 as illustrated in FIG. 8 to determine the rotation or the inclined direction of the electronic device.

According to an embodiment, the display managing module 210 may manage a display of the electronic device 101. The display managing module 210 may change a direction of an application displayed on the display 150 to a direction corresponding to the sensed rotation. The application may include one or more layers according to a function or attribute thereof. The one or more layers may share rotation and direction information of the application. Further, the display managing module 210 may identify one or more layers having direction information different from the rotation of the application from a plurality of layers included in the application displayed on the display 150. The display managing module 210 may change a direction of one or more identified layers to a direction corresponding to the rotation of the application. According to an embodiment, the display managing module 210 may determine whether a coordinate of the one or more changed layers matches a coordinate of the layer rotated according to the sensed rotation. The display managing module 210 may identify whether at least one of direction information and coordinate information of each layer is changed according to the rotation of the electronic device 101 among a plurality of layers included in the application. The display managing module 210 may match the coordinate of the one or more identified layers with the coordinate of the application rotated according to the rotation of the electronic device 101. For example, when a command for displaying a system window is input while an application is executed, the display managing module 210 may analyze coordinate information of an application displayed on the top among applications executed in the electronic device 101 and match a coordinate of the system window with the coordinate of the application displayed on the top.

According to an embodiment, the display correcting module 230 may correct a display of the electronic device 101. According to an embodiment, the display correcting module 230 may determine whether a coordinate of a first layer of the application of which a direction will be changed to a direction corresponding to the rotation of the electronic device 101 matches coordinates of one or more layers except for the first layer. The first layer may be a layer existing on the bottom of the application. According to an embodiment, when the coordinate of the first layer does not match the coordinates of the one or more layers except for the first layer, the display correcting module 230 may control a position of the one or more layers such that the coordinate of the one or more layers match the coordinate of the first layer. The one or more layers may be the remaining layers except for the first layer among the plurality of layers included in the application. According to an embodiment, the display correcting module 230 may match the coordinates of the one or more layers with the coordinate of the first layer.

According to an embodiment, the interworking controlling module 240 may control interworking between the rotation sensing module 210, the display managing module 220, and the display correcting module 230 included in the display controlling module 170. According to an embodiment, the interworking controlling module 240 may be configured to perform at least one of an operation that senses an operation status of another application installed in an auxiliary electronic device and an operation that provides an alert message to the user in response to a request for removing one or more applications by executing, for example, a management application.

Figure 3:
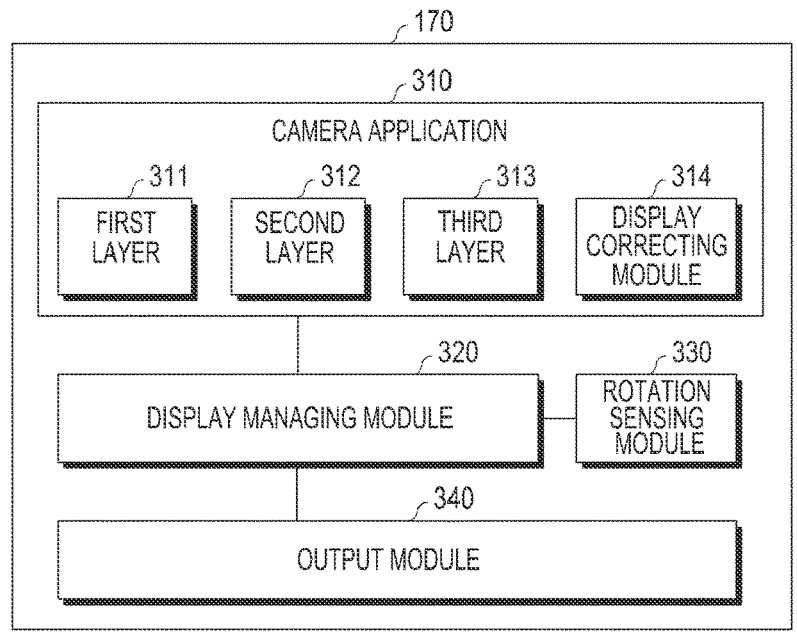
FIG. 3 is a block diagram of a display controlling module of an electronic device according to an embodiment of the present disclosure.

FIG. 3 is a block diagram of a display controlling module of an electronic device according to an embodiment of the present disclosure.

Referring to FIG. 3, an electronic device 101 is illustrated, where the electronic device 101 may include a camera module 891 as illustrated in FIG. 8. According to an embodiment, the camera module may include at least one of a first camera 151 (not shown) and a second camera 152 which photographs a still image or a moving image under a control of an application processor 810. The first camera 151 may be disposed on a front surface of the electronic device 101, and the second camera 152 may be disposed on a rear surface of the electronic device 101. According to an embodiment, the camera module 891 of the electronic device 101 may include at least one of a barrel (not shown) for zooming in/zooming out the first and/or second cameras, a motor 898 as illustrated in FIG. 8 for controlling a motion of the barrel (not shown) to zoom in/zoom out the barrel (not shown), and a flash 840K as illustrated in FIG. 8 for providing a light source for photographing according to a main purpose of the electronic device 101. The motor and the flash may be included in the camera module 891 or may be separately included in the electronic device 101.

According to an embodiment, the electronic device 101 may execute a camera application 310 and may take a picture or record an image by executing the camera application 310. When the electronic device 101 executes the camera application 310, the display controlling module 170 may include the camera application 310, a display managing module 320, a rotation sensing module 330, and an output module 340.

According to an embodiment, the camera application 310 may include a plurality of layers (e.g., a first layer 311, a second layer 312 and a third layer 313, etc.). Each of the layers may be referred to as a view. Although FIG. 3 shows only three layers, it is merely an embodiment and the camera application according to various embodiments of the present disclosure may include one or more layers. Each of the layers may include one or more of direction information and coordinate information. According to an embodiment, the direction information and the coordinate information included in each of the layers may be obtained from the camera application. According to an embodiment, as the direction information and the coordinate information included in each of the layers, direction information and coordinate information of the camera application may be used. According to an embodiment, each of the layers may provide a user interface, display an image photographed through the camera application 310, or include various functions provided by the camera application 310. According to an embodiment, the camera application 310 may include a display correcting module 314. The display correcting module 314 may correct a display of each layer of the camera application displayed on the display 150 of the electronic device 101. According to an embodiment, the display correcting module 314 may correct displays of one or more layers of the camera application displayed on the display 150 of the electronic device 101 based on a display of another layer. According to an embodiment, the display correcting module 314 may correct a display based on an application executed on the top. According to an embodiment, the display correcting module 314 may determine whether a coordinate of a first layer of the camera application of which a direction will be changed to a direction corresponding to the rotation of the electronic device 101 matches coordinates of one or more layers except for the first layer. The first layer may be a layer existing on the bottom of the camera application, a layer existing on the top, or a predetermined reference layer. According to an embodiment, when the coordinate of the first layer does not match the coordinates of the one or more layers except for the first layer, the display correcting module 314 may control a position of the one or more layers such that the coordinate of the one or more layers match the coordinate of the first layer. The one or more layers may be the remaining layers except for the first layer among the plurality of layers included in the camera application. The display correcting module 314 may be included in the camera application 310 or may be separately included in the display control module.

According to an embodiment, the display managing module 320 may manage a display of the electronic device 101. The display managing module 320 may identify one or more layers having direction information different from the rotation of the electronic device 101 from the plurality of layers included in the camera application displayed on the display 150. According to an embodiment, the display managing module 320 may identify a layer within the application having direction information different from the top application of the electronic device 101. According to an embodiment, the display managing module 320 may determine whether coordinates of the one or more changed layers match a coordinate of the layer rotated according to the sensed rotation. The display managing module 320 may identify whether at least one of direction information and coordinate information of each layer is changed according to the rotation of the electronic device 101 among the plurality of layers included in the camera application. According to an embodiment, the display managing module 320 may match the coordinates of the one or more identified layers with the coordinate of the application rotated according to the rotation of the electronic device 101. According to an embodiment, the display managing module 320 may identify a layer within the application having direction information different from the top application of the electronic device 101. The display managing module 320 may change directions of the one or more identified layers to a direction corresponding to the application. The display managing module 320 may match the coordinates of the one or more changed layers with the coordinate of the application.

According to an embodiment, the rotation sensing module 330 may sense a rotation of the electronic device 101. The rotation sensing module 210 may sense an inclined direction of the electronic device 101. Further, the rotation sensing module 210 may receive information on the rotation or the inclined direction of the electronic device 101 through at least one sensor included in the sensor module 840 to determine the rotation or the inclined direction of the electronic device 101.

According to an embodiment, the output module 340 may display the camera application on the display 150 under a control of at least one of the display managing module 320 and the processor 120. Further, the output module 340 may output the camera application having the one or more layers of which the directions have been changed to the direction corresponding to the rotation of the electronic device 101 on the display 150 under a control of at least one of the display managing module 320 and the processor 120.

Figure 4:
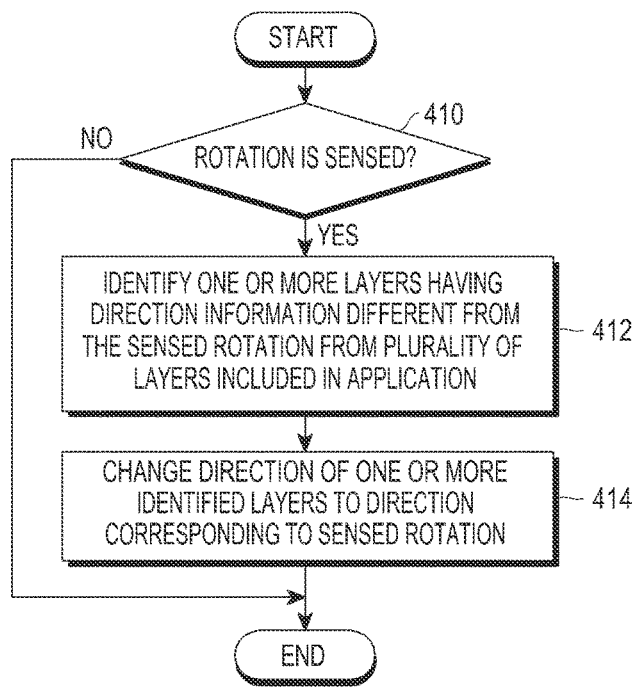
FIG. 4 is a flowchart illustrating a display controlling method of an electronic device according to an embodiment of the present disclosure.

FIG. 4 is a flowchart illustrating a display controlling method of an electronic device according to an embodiment of the present disclosure.

Referring to FIG. 4, a display controlling method of an electronic device according to an embodiment of the present disclosure is illustrated.

According to an embodiment, the rotation sensing module 220 may sense a rotation of the electronic device 101 in operation 410. According to an embodiment, the rotation sensing module 220 may receive information on the rotation of the electronic device 101 from one or more sensors included in the electronic device 101 to sense the rotation of the electronic device 101. When the electronic device 101 is rotated or a direction thereof is changed, one or more sensors included in the sensor module 840 of the electronic device 101 may sense at least one of the rotation and the direction change of the electronic device 101. According to an embodiment, when the electronic device 101 is rotated or the direction thereof is changed, the rotation sensing module 210 included in the display controlling module 170 may sense at least one of the rotation and the direction change of the electronic device 101. In contrast, when the at least one of the rotation and the direction change is not sensed in operation 410 the display controlling method ends.

According to an embodiment, one or more layers having direction information different from the sensed rotation may be identified from a plurality of layers included in the application in response to the sensing of the rotation of the electronic device 101 in operation 412. According to an embodiment, when the electronic device 101 is rotated or the direction is changed, the rotation sensing module 210 may receive a signal for the rotation or the direction change of the electronic device 101 from one or more sensors included in the sensor module 840 to determine that the electronic device 101 has been rotated or the direction thereof has been changed. According to an embodiment, the electronic device 101 may execute one or more applications and display the executed applications on the display 150. The application may include one or more layers and a number of layers varies depending on a use purpose, a type, and a manufacturer. According to an embodiment, when a direction or a progress direction corresponding to the rotation of the electronic device 101 is changed, each of the layers may include at least one of direction information and coordinate information to be displayed on the display 150 after being changed. Each of the plurality of layers may have at least one of direction information and coordinate information. The direction information may be information for controlling a direction change of a system window in response to the rotation of the electronic device 101 and the coordinate information may be information for determining a display position of the system window. According to an embodiment, the system window includes a window separately displayed from a currently executed application. The system window may be a window of an application separated from the application being executed. According to an embodiment, the system window may be provided separately from the application being executed and may include a window provided by an operating system of the electronic device in response to an input of at least one of a button and a key.

According to an embodiment, at least one of the processor 120, the display controlling module 170, and the display managing module 220 may identify one or more layers having direction information different from the sensed rotation according to the rotation of the electronic device 101. At least one of the processor 120, the display controlling module 170, and the display managing module 220 may identify whether at least one of the direction information and the coordinate information of each layer is changed according to the rotation of the electronic device 101 among the plurality of layers included in the application being currently executed. According to an embodiment, at least one of the processor 120, the display controlling module 170, and the display managing module 220 may determine which layer is changed equally to, similarly as, or in real time with the rotation of the electronic device by sensing the change of at least one of the direction information and the coordinate information of the one or more layers in response to the rotation of the electronic device 101. According to an embodiment, at least one of the processor 120, the display controlling module 170, and the display managing module 220 may determine which layer is not rotated in spite of the rotation of the electronic device 101.

According to an embodiment, directions of the one or more identified layers may be changed to a direction corresponding to the sensed rotation in operation 414. According to an embodiment, at least one of the processor 120, the display controlling module 170, and the display managing module 220 may rotate at least one of the plurality of layers included in the application according to the direction corresponding to the rotation of the electronic device 101. According to an embodiment, when one or more layers having direction information different from the rotation of the electronic device are identified from the plurality of layers included in the application, the display managing module 220 may change directions of the one or more identified layers to the direction corresponding to the sensed rotation. According to an embodiment, the display managing module 230 may match coordinates of the one or more identified layers with a coordinate of the layer rotated according to the rotation of the electronic device 101. Further, the display correcting module 230 determines whether the coordinates of the one or more changed layers match the coordinate of the layer rotated according to the sensed rotation. When the coordinates do not match, the display correcting module 230 may match the coordinates of the one or more layers with the coordinate of the layer rotated according to the sensed rotation.

According to an embodiment, when the processor 120 detects a command which executes the system window, the processor 120 may display the system window in consideration of the top layer of the application displayed on the display 150. According to an embodiment, when a command for displaying the system window is input, at least one of the processor 120, the display controlling module 170, and the display managing module 220 may analyze coordinate information of the top layer of the displayed application, match a coordinate of the system window with a coordinate of the top layer of the displayed application, and display the system window. According to an embodiment, when a command for displaying the system window is input, at least one of the processor 120, the display controlling module 170, and the display managing module 220 may analyze coordinate information of the top layer of the displayed application, match a coordinate of the system window with a coordinate of the top layer of the displayed application, and display the system window.

Figure 5:
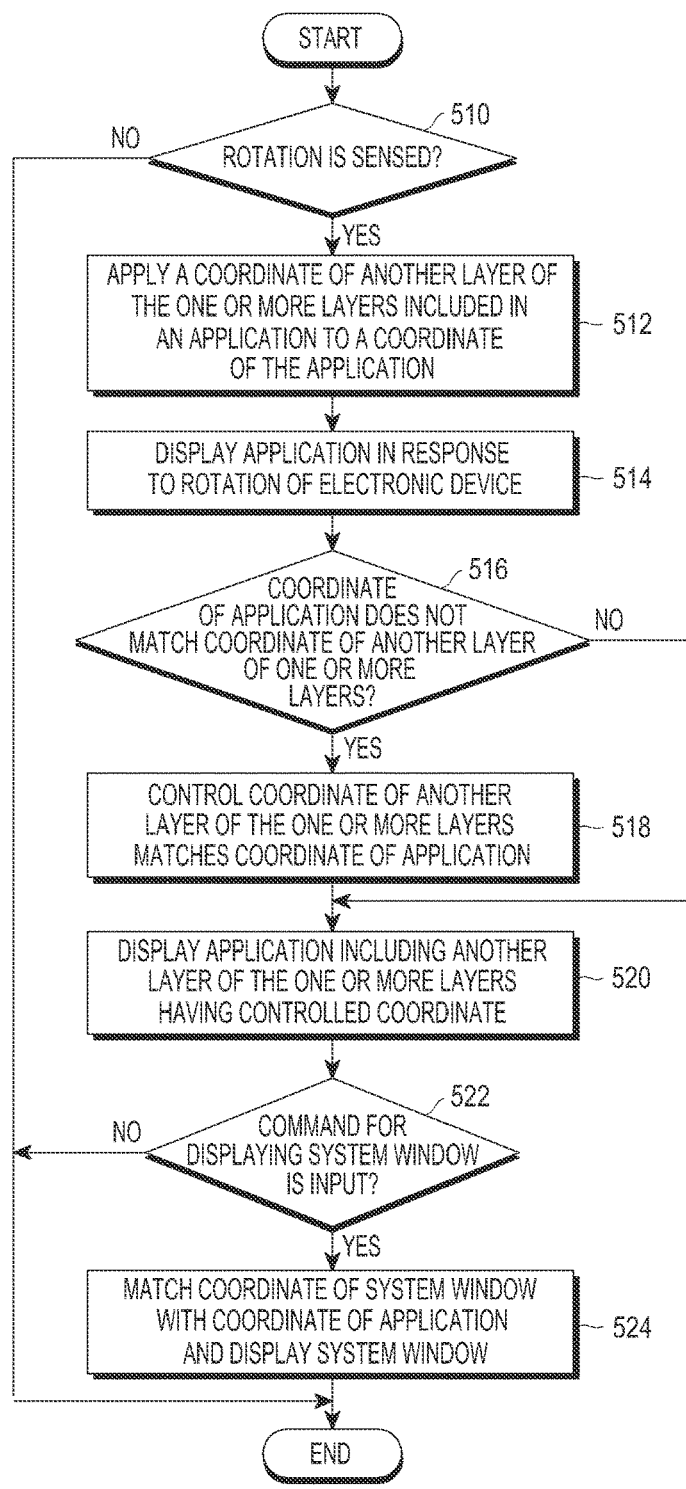
FIG. 5 is a flowchart illustrating a display controlling method of an electronic device according to an embodiment of the present disclosure.

FIG. 5 is a flowchart illustrating a display controlling method of the electronic device according to an embodiment of the present disclosure.

Referring to FIG. 5, a display controlling method of an electronic device according to an embodiment of the present disclosure is illustrated.

According to an embodiment, the rotation sensing module 220 may sense a rotation of the electronic device 101 in operation 510. According to an embodiment, the rotation sensing module 220 may receive information on the rotation of the electronic device 101 from one or more sensors included in the electronic device 101 to sense the rotation of the electronic device 101. In an embodiment, if no rotation is sensed in operation 510, then the controlling method illustrated in FIG. 5 ends.

According to an embodiment, a coordinate of the one or more layers included in the application is applied to a coordinate of the application in response to the sensing of the rotation of the electronic device 101 in operation 512. According to an embodiment, when the electronic device 101 is rotated or the direction is changed, the rotation sensing module 210 may receive a signal for the rotation or the direction change of the electronic device 101 from one or more sensors included in the sensor module 840 to determine that the electronic device 101 has been rotated or the direction thereof has been changed.

According to an embodiment, the electronic device 101 may display the application on the display 150 in response to the rotation of the electronic device 101 in operation 514. The application may include one or more layers and a number of layers varies depending on a use purpose, a type, and a manufacturer. According to an embodiment, when a direction or a progress direction corresponding to the rotation of the electronic device 101 is changed, each of the layers may include at least one of direction information and coordinate information to be displayed on the display 150 after being changed.

According to an embodiment, the display managing module 220 may apply coordinates of one or more layers except for a first layer of the application being executed to a coordinate of the first layer of the application in response to the rotation of the electronic device 101, and the first layer may be located on the bottom of the application and may be rotated in real time in response to the rotation of the electronic device 101. According to an embodiment, the first layer may be linked with the display 150 of the electronic device 101 and thus rotated in real time. The first layer may be located on the bottom or the top of the application. According to an embodiment, the first layer may be located at any one position of the application including a plurality of layers. According to an embodiment, at least one of the processor 120 and the display controlling module 170 may control rotations of one or more applications displayed on the display 150 in response to the rotation of the electronic device 101.

According to an embodiment, it may be determined whether the coordinate of the application matches the coordinates of the one or more layers in operation 516. When the coordinates do not match, the coordinate of the one or more layers are controlled to match the coordinate of the application (or first layer) in operation 518. According to an embodiment, at least one of the processor 120, the display controlling module 170, and the display correcting module 230 may determine whether the coordinate of the application (or coordinate of the first layer) matches the coordinates of the one or more layers (only except for the first layer). When the coordinates do not match, display positions of the one or more layers may be controlled to match a position of the application (or a position of the first layer). The determination on whether the coordinates match each other may include changing the coordinates of the one or more layers to match the coordinate of the application. According to an embodiment, when it is determined that the coordinate of the application does not match the coordinates of the one or more layers, the display correcting module 230 may control the positions of the one or more layers such that the coordinates of the one or more layers match the coordinate of the application. According to an embodiment, the display correcting module 230 may match the coordinates of the one or more layers with the coordinate of the application (or coordinate of the first layer).

According to an embodiment, the application having the one or more layers of which the coordinates have been controlled is displayed in operation 520. When the coordinate of the first layer matches the coordinates of the one or more layers, the application is displayed in operations 516 and 520. According to an embodiment, the display managing module 220 may match the coordinates of the one or more layers with the coordinate of the first layer among the plurality of layers included in the application in response to the rotation of the electronic device 101 and then display the application on the display 150. The display may be made in real time in response to the rotation or the direction changed of the electronic device 101.

According to an embodiment, it may be identified whether a command for displaying a system window is input in operation 522. According to an embodiment, when it is identified that a command for displaying a system window is not input, then the controlling method illustrated in FIG. 5 ends According to an embodiment, when it is identified whether the system window is displayed, at least one of the processor 120, the display controlling module 170, and the display managing module 220 matches a coordinate of the system window with the coordinate of the application in operation 524. According to an embodiment, the system window includes a window separately displayed from a currently executed application. The system window may be a window of an application separated from the executed application. According to an embodiment, the system window may be provided separately from the application being executed and may include a window provided by an operating system of the electronic device in response to an input of at least one of a button and a key included in the electronic device. The display managing module 220 may match the coordinate of the system window with the coordinate of the application and display the system window. According to an embodiment, the display managing module 220 may match the coordinate of the system window with coordinates of one or more of the plurality of layers included in the application being executed. When a command for displaying the system window is input while the application is displayed, the display managing module 220 may match the coordinate of the system window with the coordinate of the displayed application.

FIGS. 6A and 6B illustrate an example of a plurality of layers included in a camera application according to an embodiment of the present disclosure.

Referring to FIGS. 6A and 6B, FIG. 6A illustrates a preview image displayed in the camera application according to an embodiment and FIG. 6B illustrates a plurality of layers included in the camera application according to an embodiment.

Although FIGS. 6A and 6B illustrate only a camera application as an example, it is merely an embodiment and it is apparent that the present disclosure can be applied to various applications, which can be executed in an electronic device 101 and includes one or more layers, as well as the camera application.

Referring to FIG. 6A, a preview image is displayed in the camera application according to the embodiment of the present disclosure. When the camera application is executed, the preview image by the executed camera application is displayed on the display 150. The preview image is displayed on the display 150 in response to a position change of the electronic device 101. According to an embodiment, the camera application may include various menus such as a menu that receives a selection from the user to photograph a picture or a video, a menu that configures an environment of the camera application, and a menu that selects each of cameras included in the electronic device 101.

Referring to FIG. 6B, a plurality of layers included in a camera application according to the embodiment are illustrated. According to an embodiment, the camera application in a state where the electronic device 101 lies vertically may include one or more layers. Although FIG. 6B illustrates that the camera application includes only three layers 610, 620, and 630, it is merely an embodiment and the camera application according to the present disclosure may include two or more layers. According to an embodiment, the camera application according to the present disclosure may include a plurality of activities and each of the activities may include one or more layers. According to an embodiment, each of the layers included in the camera application may include direction information and coordinate information.

According to an embodiment, a first layer 610 may be located on the bottom of the camera application, a second layer 620 may be located on the first layer 610, and a third layer 630 may be located on the second layer 620. According to an embodiment, the first layer 610 is not directly shown to the user, but serves as a container which contains other layers and may be called a layout. The layout may include a frame layout, a relative layout, and a linear layout. According to an embodiment, the second layer 620 displays a preview image photographed in the camera application. According to an embodiment, the third layer 630 may include various functions provided by the camera application. The third layer 630 may include a menu 635 for switching at least two cameras included in the electronic device 101, a menu 636 providing a flash, and a menu 637 for configuration an environment of the camera application. According to an embodiment, the third layer 630 may include various menus such as a button, a text view, a text editing, a radio button and the like as well as the plurality of menus 635, 636, and 637 according to a type of application.

According to an embodiment, each of the layers 610, 620, and 630 may include at least one of direction information and coordinate information. A coordinate value 611 of an upper right end of the first layer 610 is (0,0), a coordinate value 612 of an upper left end is (N,0), a coordinate value 613 of a lower right end is (0,M), and a coordinate value 614 of a lower left end is (N,M). Similarly, a coordinate value of an upper right end of the second layer 620 may be (0,0), a coordinate value of an upper left end may be (N,0), a coordinate value of a lower right end may be (0,M), and a coordinate value of a lower left end may be (N,M). Referring to FIG. 6B, although the coordinate value of the upper right end is set as (0,0), it is only an embodiment and the lower right end, the upper left end, or the lower left end may be set as (0,0). When the electronic device 101 is rotated, the coordinate values may be changed. For example, when a coordinate value of an upper right end of the electronic device 101 in a vertical state is set as (0,0) but the vertical state of the electronic device 101 is changed to a horizontal state, one of coordinate values of a lower right end, an upper left end, and a lower left end of the electronic device 101 in the vertical state may be set as (0,0). N and M refer to pixel coordinate values and the pixel coordinate value varies depending on a size of the display 150. According to an embodiment, coordinate values 611, 612, and 613 may be used when matching another layer. According to an embodiment, pixels of the display 150 may have different coordinate values. According to an embodiment, each of the coordinate values may be changed according to a rotation direction of the electronic device 101.

Figure 7A:
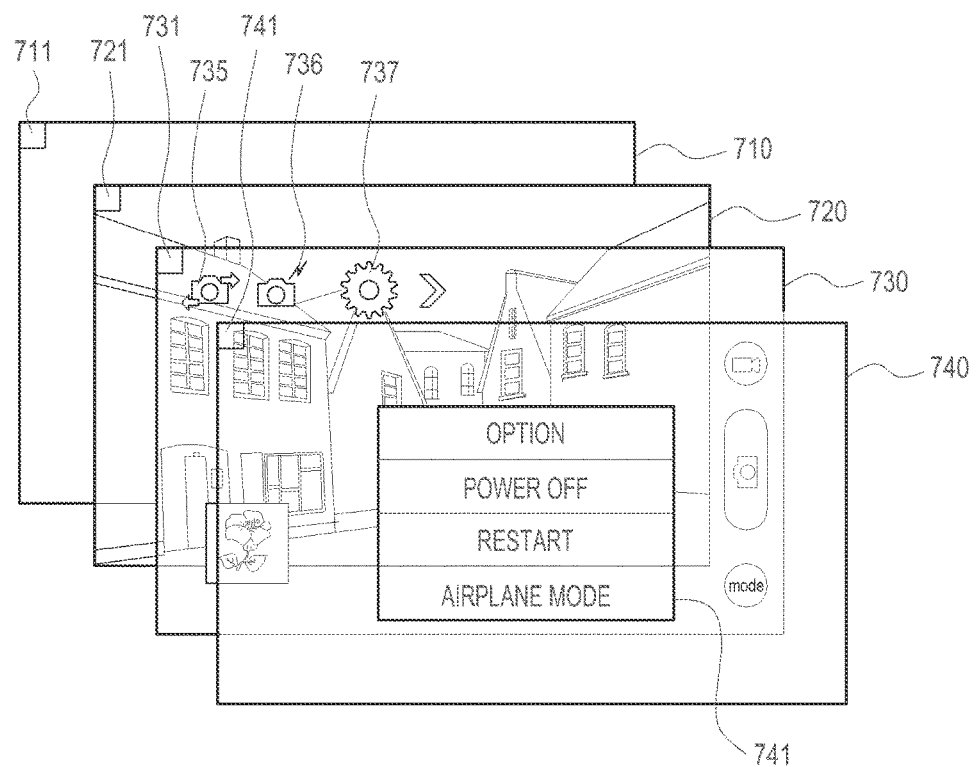
FIG. 7A illustrates an example where a system window is displayed in a state where an electronic device lies horizontally according to an embodiment of the present disclosure.
Figure 7B:
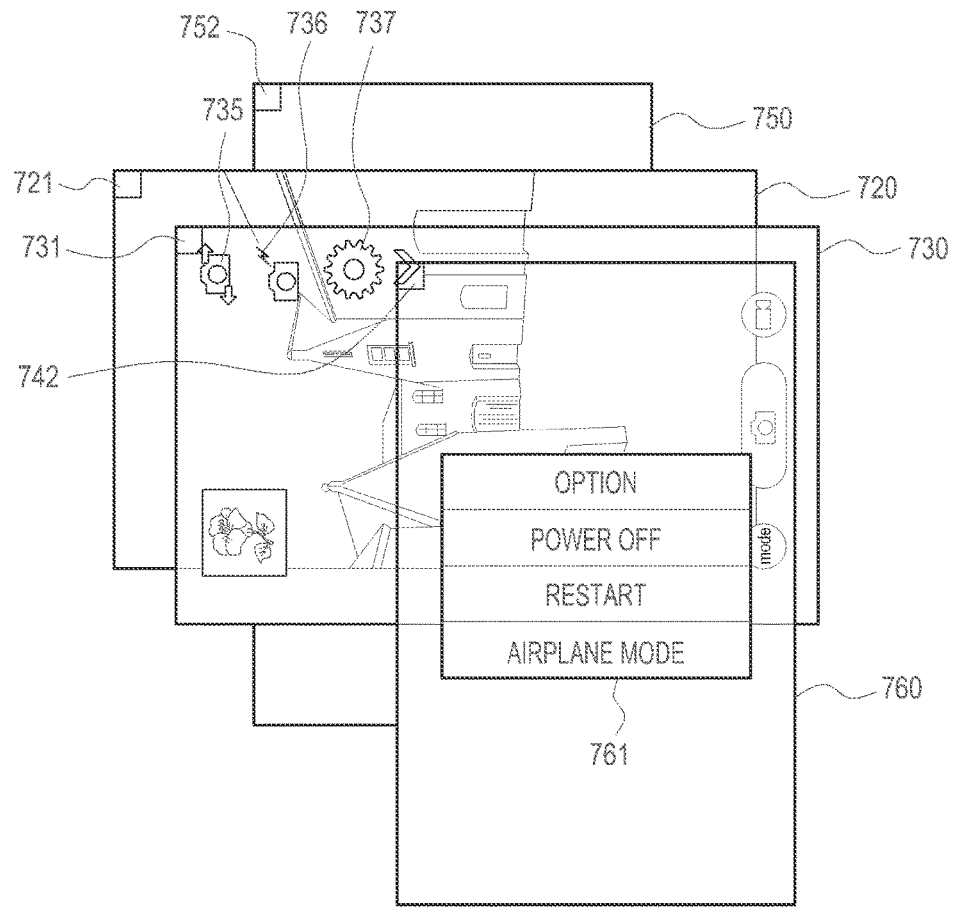
FIG. 7B illustrates an example of a plurality of layers included in a camera application when an electronic device lying horizontally is rotated vertically according to an embodiment of the present disclosure.
Figure 7C:
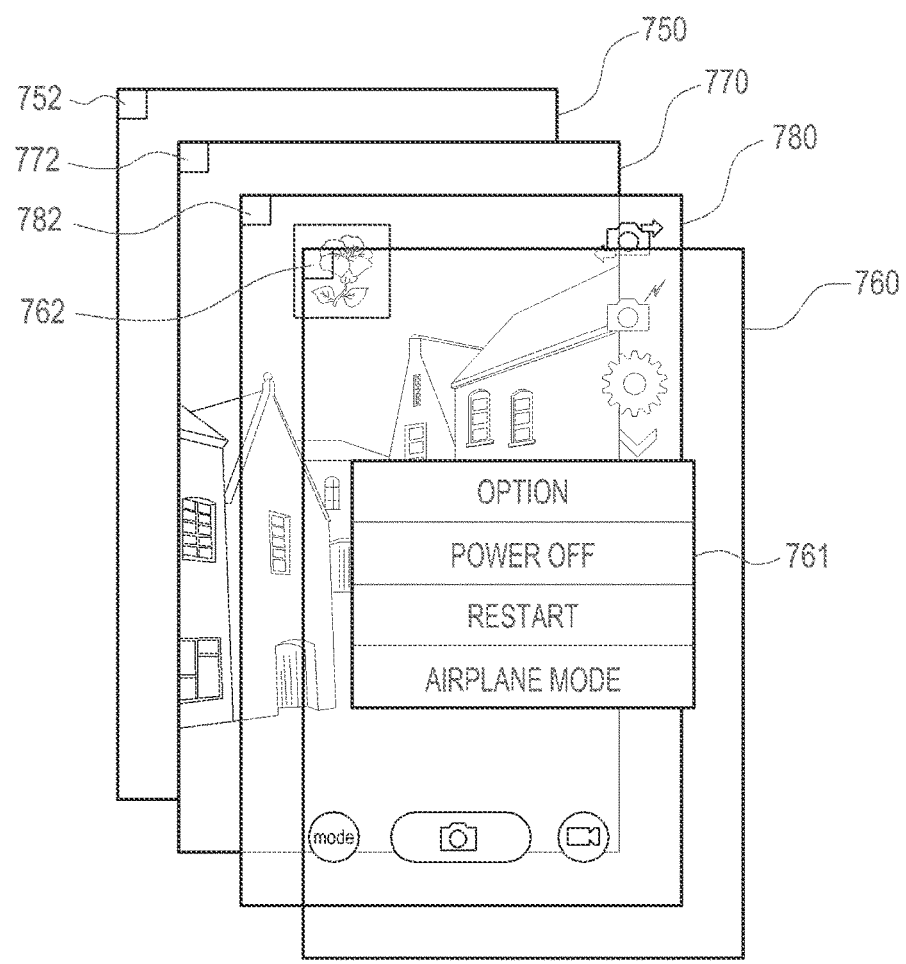
FIG. 7C illustrates an example of a plurality of layers included in a camera application after an electronic device is rotated vertically according to an embodiment of the present disclosure.

FIGS. 7A to 7C illustrate an example of a display of a system window in a state where a camera application including a plurality of layers is executed according to an embodiment of the present disclosure.

FIG. 7A illustrates an example where a system window is displayed when an electronic device lies horizontally according to an embodiment, FIG. 7B illustrates an example of a plurality of layers included in a camera application when an electronic device lies horizontally and rotates vertically according to an embodiment, and FIG. 7C illustrates an example of a plurality of layers included in a camera application after an electronic device is vertically rotated according to an embodiment.

Referring to FIG. 7A, the system window is displayed in a state where the electronic device according to the embodiment lies horizontally. According to an embodiment, in the camera application executed in the state where the electronic device 101 lies horizontally, each of layers 710, 720, and 730 are rotated and displayed according to a state of the electronic device 101 lying horizontally. The camera application may include a landscape mode and a portrait mode and can switch therebetween. A fourth layer 740 including a system window 741 may be displayed on the third layer 730 in response to an input of a command for executing the system window in such a state.

According to an embodiment, the first layer 710 may be located on the bottom of the camera application, the second layer 720 may be located on the first layer 710, and the third layer 730 may be located on the second layer 720. According to an embodiment, the fourth layer 740 may be located on the third layer 730. According to an embodiment, the fourth layer 740 may be located on any position between the layers. According to an embodiment, the first layer 610 is not directly shown to the user, but serves as a container which contains other layers and may be called a layout or a User Interface (UI) view. The second layer 720 displays a preview image photographed in the camera application. According to an embodiment, the third layer 730 may include various functions provided by the camera application. The third layer 730 may include a menu 735 for switching at least two cameras included in the electronic device 101, a menu 736 providing a flash, and a menu 737 for configuration of an environment of the camera application. The menus 735, 736, and 737 may be rotated in response to the rotation of the electronic device 101 (for example, when the electronic device is rotated in a counterclockwise direction, the menus 735, 635, and 637 of FIG. 6B are displayed like the menus 735, 736, and 737 of FIG. 7A). According to an embodiment, the fourth layer 740 may include the system window 741. According to an embodiment, the system window 741 may include a window separately displayed from a currently executed application. According to an embodiment, the system window 741 may be a window of an application separated from the executed application. According to an embodiment, the system window 741 may be provided separately from the application being executed and may include a window provided by an operating system of the electronic device in response to an input of at least one of a button and a key included in the electronic device. According to an embodiment, the system window 741 may include a user interface in a drop down type which is accessible in any situation or anywhere regardless of an execution of the application. The user interface may be executed to configure an operation of turning on/off WiFi, Bluetooth, GPS and the like and/or an operation of controlling screen brightness, a volume of the electronic device. The user interface may be called a quick panel. Although FIG. 7A illustrates the system window displayed due to an input of a power key (now shown) included in the electronic device 101, it is only an embodiment and it is apparent that the present disclosure can be applied to a window corresponding to a function configured by another application or another user's input as well as the system window corresponding to the input of the power key. According to an embodiment, the layers 710, 720, 730, and 740 may be displayed while their coordinates 711, 721, 731, and 741 match each other in response to the rotation of the electronic device 101.

Referring to FIG. 7B, a plurality of layers included in the camera application when the electronic device according to an embodiment which lies horizontally is rotated vertically are illustrated. According to an embodiment, the camera application may include a landscape mode and a portrait mode and can switch therebetween. According to an embodiment, one or more layers included in the camera application may be individually rotated. According to an embodiment, each of the layers included in the camera application may be changed or rotated according to a coordinate of an application dependent on the camera application. According to an embodiment, when the electronic device 101 is rotated from a horizontal state to a vertical state, the first layer 750 may be rotated in accordance with a rotation direction of the electronic device 101. Further, the first layer 750 may be rotated simultaneously with the electronic device 101 when the electronic device 101 is rotated. According to an embodiment, the second layer 720 and the third layer 730 may not be simultaneously rotated. According to an embodiment, when a power key (not shown) is input, the fourth layer 760 may be displayed in response to the rotation of the electronic device 101. According to an embodiment, the fourth layer 760 may include a system window 761. According to an embodiment, orientations of the second layer 720 and the third layer 730 may not match a rotation direction of the first layer 750. For example, the coordinates of the layers 710, 720, 730, and 740 match each other according to an application mode when the electronic device 101 lies horizontally as illustrated in FIG. 7A. However, as illustrated in FIG. 7B, when the electronic device 101 is vertically rotated, orientations of the second layer 720 and the third layer 730 do not match an orientation of the first layer 750. In this case, in order to match the orientations of the second layer 720 and the third layer 730 with the rotation direction of the first layer 750, the coordinate values 721 and 731 of the second layer 720 and the third layer 730 may be changed to the coordinate values 742 and 752 of the first layer and the fourth layer 760. For example, the display managing module 220 may change coordinate values of upper left ends of the second layer 720 and the third layer 730 to a coordinate value of an upper left end 752 of the first layer.

Referring to FIG. 7C, a plurality of layers included in the camera application after the electronic device according to an embodiment is vertically rotated are illustrated. A second layer 770 and a third layer 780 are controlled to match the rotation direction of the first layer 750. According to an embodiment, a rotation direction of the fourth layer 760 may be controlled according to the coordinate of the camera application. According to an embodiment, the fourth layer 760 may be displayed after being rotated with reference to a coordinate value 782 of the third layer 780. Further, the fourth layer 760 may be displayed after being rotated with reference to coordinate value(s) 752, 772, and 762 of one of the first to third layers 750, 760, and 770. The layers 750, 760, and 770 may be rotated in real time in response to the rotation of the electronic device 101. According to an embodiment, due to a rotation of the fourth layer, a system window 761 included in the fourth layer 760 may be rotated in real time in response to the rotation of the electronic device 101. In this case, the user may recognize the rotations of the layers 750, 770, 780, and 760.

FIG. 8 is a block diagram of an electronic device according to an embodiment of the present disclosure.

Referring to FIG. 8, an electronic device 801, including at least one Application Processor (AP) 810, a communication module 820, a Subscriber Identifier Module (SIM) card 824, a memory 830, a sensor module 840, an input device (module) 850, a display 860, an interface 870, an audio module 880, a camera module 891, a power managing module 895, a battery 896, an indicator 897, and a motor 898, is illustrated.

The AP 810 may control a plurality of hardware or software components connected to the AP 810 by driving an operating system or an application program and process various data including multimedia data and perform calculations. The AP 810 may be implemented by, for example, a SoC. According to an embodiment, the AP 810 may further include a Graphic Processing Unit (GPU).

The communication module 820 (for example, communication interface 160) may transmit/receive data in communication between different electronic devices (for example, the electronic device 104 and the server 106) connected to the electronic device 801 through a network. According to an embodiment, the communication module 820 may include a cellular module 821, a WiFi module 823, a BlueTooth (BT) module 825, a GPS module 827, an NFC module 828, and a Radio Frequency (RF) module 829.

The cellular module 821 may provide a voice, a call, a video call, a SMS, or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 821 may distinguish and authenticate electronic devices within a communication network by using a subscriber identification module (for example, the SIM card 824). According to an embodiment, the cellular module 821 may perform at least some of the functions which can be provided by the AP 810. For example, the cellular module 821 may perform at least some of the multimedia control functions.

According to an embodiment, the cellular module 821 may include a Communication Processor (CP). Further, the cellular module 821 may be implemented by, for example, an SoC. Although FIG. 8 illustrates that the components such as the cellular module 821 (for example, communication processor), the memory 830, and the power managing module 895 are separate components of the AP 810, the AP 810 may include at least some of the above described components (for example, cellular module 821) according to an embodiment.

According to an embodiment, the AP 810 or the cellular module 821 (for example, communication processor) may load a command or data received from at least one of a non-volatile memory and other components connected to each of the AP 810 and the cellular module 821 to a volatile memory and process the loaded command or data. Further, the AP 810 or the cellular module 821 may store data received from at least one of other components or generated by at least one of other components in a non-volatile memory.

Each of the WiFi module 823, the BT module 825, the GPS module 827, and the NFC module 828 may include a process for processing data transmitted/received through the corresponding module. Referring to FIG. 8, the cellular module 821, the WiFi module 823, the BT module 825, the GPS module 827, and the NFC module 828 are illustrated as blocks separated from each other, but at least some (for example, two or more) of the cellular module 821, the WiFi module 823, the BT module 825, the GPS module 827, and the NFC module 828 may be included in one Integrated Chip (IC) or one IC package. For example, at least some (for example, the communication processor corresponding to the cellular module 821 and the WiFi processor corresponding to the WiFi module 823) of the processors corresponding to the cellular module 825, the WiFi module 827, the BT module 828, the GPS module 827, and the NFC module 823 may be implemented by one SoC.

The RF module 829 may transmit/receive data, for example, an RF signal. The RF module 829 may include, for example, a transceiver, a Power Amp Module (PAM), a frequency filter, a Low Noise Amplifier (LNA) or the like, which is not illustrated in FIG. 8. Further, the RF module 829 may further include a component for transmitting/receiving electronic waves over a free air space in wireless communication, for example, a conductor, a conducting wire or the like. Although FIG. 8 illustrates that the cellular module 821, the WiFi module 823, the BT module 825, the GPS module 827, and the NFC module 828 share one RF module 829, at least one of the cellular module 821, the WiFi module 823, the BT module 825, the GPS module 827, and the NFC module 828 may transmit/receive an RF signal through a separate RF module.

The SIM card 824 may be a card including a subscriber identification module and may be inserted into a slot formed in a particular portion of the electronic device. The SIM card 824 may include unique identification information (for example, Integrated Circuit Card IDentifier (ICCID)) or subscriber information (for example, International Mobile Subscriber Identity (IMSI)).

The memory 830 (for example, memory 130) may include an internal memory 832 or an external memory 834. The internal memory 832 may include at least one of a volatile memory (for example, a Dynamic Random Access Memory (DRAM), a Static RAM (SRAM), a Synchronous Dynamic RAM (SDRAM) or the like) or a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory or the like).

According to an embodiment, the internal memory 832 may be a Solid State Drive (SSD). The external memory 834 may further include a flash drive, for example, a Compact Flash (CF), a Secure Digital (SD), a Micro Secure Digital (Micro-SD), a Mini Secure Digital (Mini-SD), an extreme Digital (xD), a memory stick or the like. The external memory 834 may be functionally connected to the electronic device 801 through various interfaces. According to an embodiment, the electronic device 801 may further include a storage device (or storage medium) such as a hard drive.

The sensor module 840 may measure a physical quantity or detect an operation status of the electronic device 801, and convert the measured or detected information to an electronic signal. The sensor module 840 may include, for example, at least one of a gesture sensor 840A, a gyro sensor 840B, an atmospheric pressure sensor 840C, a magnetic sensor 840D, an acceleration sensor 840E, a grip sensor 840F, a proximity sensor 840G, a color sensor 840H (for example, red, green, and blue (RGB) sensor), a biometric sensor 840I, a temperature/humidity sensor 840J, an illumination sensor 840K, and an Ultra Violet (UV) sensor 840M. Additionally or alternatively, the sensor module 840 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), an InfraRed (IR) sensor, an iris sensor (not illustrated), a fingerprint sensor, and the like. The sensor module 840 may further include a control circuit for controlling one or more sensors included in the sensor module 840.

The input device (module) 850 may include a touch panel 852, a (digital) pen sensor 854, a key 856, or an ultrasonic input device 858. The touch panel 852 may recognize a touch input in at least one type among, for example, a capacitive type, a resistive type, an infrared type, and an acoustic wave type. The touch panel 852 may further include a control circuit. In the capacitive type, a physical contact or a proximity recognition is possible. The touch panel 852 may further include a tactile layer. In this case, the touch panel 852 may provide a tactile reaction to the user.

The (digital) pen sensor 854 may be implemented, for example, using a method identical or similar to a method of receiving a touch input of a user or using a separate recognition sheet. The key 856 may include, for example, a physical button, an optical key or a keypad. The ultrasonic input device 858 is a device which can detect an acoustic wave by a microphone (for example, microphone 888) of the electronic device 801 through an input tool generating an ultrasonic signal to identify data and can perform wireless recognition. According to an embodiment, the electronic device 801 may receive a user input from an external device (for example, computer or server) connected to the electronic device 801 by using the communication module 820.

The display 860 (for example, display 150) may include a panel 862, a hologram device 864, or a projector 866. For example, the panel 862 may be a Liquid Crystal Display (LCD) or an Active Matrix Organic Light Emitting Diode (AM-OLED). The panel 862 may be implemented to be, for example, flexible, transparent, or wearable. The panel 862 may be configured by the touch panel 852 and one module. The hologram device 864 may show a stereoscopic image in the air by using interference of light. The projector 866 may project light on a screen to display an image. For example, the screen may be located inside or outside the electronic device 801. According to an embodiment, the display 860 may further include a control circuit for controlling the panel 862, the hologram device 864, or the projector 866.

The interface 870 may include, for example, a High-Definition Multimedia Interface (HDMI) 872, a Universal Serial Bus (USB) 874, an optical interface 876, or a D-sub-miniature (D-sub) 878. The interface 870 may be included in, for example, the communication interface 160 illustrated in FIG. 1. Additionally or alternatively, the interface 290 may include, for example, a Mobile High-definition Link (MHL) interface, a Secure Digital (SD)/Multi-Media Card (MMC) interface, or an Infrared Data Association (IrDA) standard interface.

The audio module 880 may bi-directionally convert a sound and an electronic signal. At least some components of the audio module 880 may be included in, for example, the input/output interface 140 illustrated in FIG. 1. The audio codec 880 may convert sound information input or output through, for example, a speaker 882, a receiver 884, an earphone 886, the microphone 888 or the like.

The camera module 891 is a device which can photograph an image and a dynamic image. According to an embodiment, the camera module 291 may include one or more image sensors (for example, a front lens or a back lens), a lens (not shown), an Image Signal Processor (ISP) (not shown) or a flash (not shown) (for example, LED or xenon lamp).

The power managing module 895 may manage power of the electronic device 801. Although not illustrated, the power managing module 895 may include, for example, a Power Management Integrated Circuit (PMIC), a charger Integrated Circuit (IC), or a battery or fuel gauge.

The PMIC may be mounted in, for example, an integrated circuit or an SoC semiconductor. Charging methods may be classified into a wired charging method and a wireless charging method. The charger IC can charge a battery and can prevent introduction of over-voltage or over-current from a charger. According to an embodiment, the charger IC may include a charger IC for at least one of the wired charging method and the wireless charging method. A magnetic resonance scheme, a magnetic induction scheme, or an electromagnetic scheme can be exemplified as the wireless charging method, and an additional circuit for wireless charging, such as a coil loop circuit, a resonance circuit, a rectifier circuit, and the like may be added.

The battery gauge may measure, for example, a remaining quantity of the battery 896, or a voltage, a current, or a temperature during the charging. The battery 896 may store or generate electricity and supply power to the electronic device 801 by using the stored or generated electricity. The battery 896 may include, for example, a rechargeable battery or a solar battery.

The indicator 897 may show particular statuses of the electronic device 801 or a part (for example, AP 810) of the electronic device 801, for example, a booting status, a message status, a charging status and the like. The motor 898 may convert an electrical signal to a mechanical vibration. Although not illustrated, the electronic device 801 may include a processing unit (for example, GPU) for supporting a mobile TV. The processing unit for supporting the mobile TV may process media data according to a standard of Digital Multimedia Broadcasting (DMB), Digital Video Broadcasting (DVB), media flow or the like.

Each of the components of the electronic device according to the present disclosure may be implemented by one or more components and the name of the corresponding component may vary depending on a type of the electronic device. The electronic device according to the present disclosure may include one or more of the aforementioned components or may further include other additional components, or some of the aforementioned components may be omitted. Further, some of the components of the electronic device according to the present disclosure may be combined to be one entity, which can perform the same functions as those of the components before the combination.

The term "module" used in the present disclosure may refer to, for example, a unit including a combination of two or more of hardware, software, and firmware. The "module" may be interchangeably used with a term, such as unit, logic, logical block, component, or circuit. The "module" may be a minimum unit of an integrally configured article or a part thereof. The "module" may be a minimum unit performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which have been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, processor 210), the one or more processors may execute a function corresponding to the command. The computer-readable storage medium may be, for example, the memory 220. At least some of the programming modules may be implemented (for example, executed) by, for example, the processor 210. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program command (for example, programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. The operations performed by the module, the programming module, or other components according to the present disclosure may be performed by a sequential, parallel, repetitive, or heuristic method. Further, some operations may be executed according to another order or may be omitted, or other operations may be added.

According to various embodiments, in a storage medium storing commands, the commands are configured to allow one or more processors to perform one or more operations when the commands are executed by the one or more processor. The one or more operations may include an operation that senses a rotation of the electronic device, an operation that identifies one or more layers having direction information different from the sensed rotation among a plurality of layers included in an application, an operation that changes directions of the identified one or more layers to a direction corresponding to the sensed rotation, and an operation that displays the changed application. Further, the command may further include an operation that determines whether coordinates of the changed one or more layers match a coordinate of the layer rotated in response to the sensed rotation and an operation that, when the coordinates do not match, matches the coordinates of the one or more layers with the coordinate of the layer rotated in response to the sensed rotation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a display of an electronic device, the method comprising:
    sensing, by the electronic device, a rotation of the electronic device;
    identifying at least one layer having direction information that is different from the sensed rotation among a plurality of layers included in an application;
    changing a direction of the identified at least one layer to a direction corresponding to the sensed rotation; and
    displaying the application including the changed at least one layer,
    wherein each of the plurality of layers includes at least one of direction information or coordinate information for changing to the direction corresponding to the rotation of the electronic device, and
    wherein the identifying of the at least one layer comprises identifying whether at least one of the direction information or the coordinate information of each of the plurality of layers is changed according to the rotation of the electronic device.

2. The method of claim 1, further comprising:
    determining whether a coordinate of the changed at least one layer matches a coordinate of a layer rotated according to the sensed rotation; and
    if the coordinates of the changed at least one layer and the layer rotated according to the sensed rotation do not match, matching the coordinate of the changed at least one layer with a coordinate of the application rotated according to the sensed rotation.

3. The method of claim 1, further comprising, if a command executing a window which is not related to the displayed application is detected, displaying the window in consideration of a coordinate of the displayed application.

4. The method of claim 1, wherein the changing of the direction of the identified at least one layer comprises matching a coordinate of the identified at least one layer with a coordinate of the application in response to the rotation of the electronic device.

5. The method of claim 1, further comprising:
    if a command for displaying a window which is not related to the displayed application is input while the application is executed, analyzing coordinate information of the displayed application; and
    matching a coordinate of the window with a coordinate of the displayed application and displaying the window.

6. The method of claim 1,
    wherein the direction information corresponds to information for controlling a change in a direction of a window which is not related to the displayed application in response to the rotation of the electronic device, and
    wherein the coordinate information corresponds to information for determining a display position of the window.

7. The method of claim 1, wherein the changed application may be displayed in real time in response to the rotation of the electronic device.

8. A method for controlling a display of an electronic device, the method comprising:
    recognizing, by the electronic device, at least one layer of which a direction is configured independently from an application among a plurality of layers corresponding to the application;
    if a direction of the at least one layer does not match a direction of the application, changing a coordinate of the at least one layer based on a coordinate of the application; and
    displaying the application based on the change,
    wherein each of the layers included in the application has at least one of direction information or coordinate information for changing to a direction corresponding to a rotation of the electronic device, and
    wherein the method further comprises identifying whether there is at least one layer having the direction information or the coordinate information different from the rotation of the electronic device in the plurality of layers included in the application.

9. The method of claim 8, further comprising comparing the directions of the at least one layer and the application, wherein the comparing of the directions is performed in response to the rotation of the electronic device or is performed periodically.

10. The method of claim 8, further comprising, if the directions of the at least one layer and the application do not match, controlling a position of the at least one layer such that a coordinate of the at least one layer matches a coordinate of the application.

11. The method of claim 10, wherein the controlling of the position comprises matching the coordinate of the at least one layer with the coordinate of the application.

12. The method of claim 8, wherein the changing of the coordinate comprises changing a coordinate of the at least one layer to match the coordinate of the application.

13. The method of claim 8, further comprising displaying a window which is not related to the displayed application in consideration of the coordinate of the displayed application.

14. The method of claim 8, further comprising, if a command for displaying a coordinate of a window which is not related to the application is input while the application is displayed, matching a coordinate of the window with the coordinate of the displayed application and displaying the window.

15. The method of claim 8, wherein a first layer is a layer rotated in real time in response to a rotation of the electronic device.

16. An electronic device for controlling a display, the electronic device comprising:
a screen configured to display an application;
a sensor module configured to include at least one sensor that senses a rotation of the electronic device; and
a display controlling module configured to identify at least one layer having direction information that is different from the sensed rotation among a plurality of layers included in the displayed application in response to the rotation of the electronic device and to change a direction of the identified at least one layer to a direction corresponding to the sensed rotation,
wherein each of the plurality of layers includes at least one of direction information or coordinate information for changing to the direction corresponding to the rotation of the electronic device, and
wherein the display controlling module is further configured to identify whether the at least one of the direction information or the coordinate information of each of the plurality of layers is changed according to the rotation of the electronic device.

17. The electronic device of claim 16, wherein the display controlling module comprises a rotation sensing module configured to sense the rotation and a display managing module configured to identify the at least one layer having the direction information that is different from the sensed rotation among the plurality of layers included in the displayed application in response to the rotation of the electronic device and to change the direction of the identified at least one layer to the direction corresponding to the sensed rotation.

18. The electronic device of claim 16, wherein the display controlling module further comprises a display correcting module configured to:
determine whether a coordinate of a first layer to be rotated in the direction corresponding to sensed rotation matches a coordinate of the at least one layer, and
if the coordinates of the first layer and the at least one layer do not match, control a position of the at least one layer such that the coordinate of the at least one layer matches a coordinate of the application.

19. The electronic device of claim 18, wherein the display correcting module is configured to match the coordinate of the at least one layer with the coordinate of the application.

20. The electronic device of claim 17, wherein the display managing module is configured to determine whether a coordinate of the changed at least one layer matches a coordinate of a layer rotated in response to the sensed rotation.

21. The electronic device of claim 16,
further comprising a controller configured to detect a command executing a window which is not related to the displayed application,
wherein the controller displays the window in consideration of a coordinate of the displayed application.

22. The electronic device of claim 17, wherein the display managing module is configured to match a coordinate of the identified at least one layer with a coordinate of the application in response to the rotation of the electronic device.

23. The electronic device of claim 21, wherein, if a command for displaying a window which is not related to the application is input while the application is executed, a display managing module is configured to analyze coordinate information of the displayed application and to match a coordinate of the window with a coordinate of the displayed application.

24. The electronic device of claim 21, wherein the controller rotates a bottom layer of the application in real time in response to the rotation of the electronic device.

25. A non-transitory computer-readable recording medium having a program recorded thereon, the program for controlling a display of an electronic device, and the program causing a computer to execute a method comprising:
sensing a rotation of the electronic device;
identifying at least one layer having direction information that is different from the sensed rotation among a plurality of layers included in an application;
changing a direction of the identified at least one layer to a direction corresponding to the sensed rotation; and
displaying the application including the changed at least one layer,
wherein each of the plurality of layers includes at least one of direction information or coordinate information for changing to the direction corresponding to the rotation of the electronic device, and
wherein the identifying of the at least one layer comprises identifying whether at least one of the direction information or the coordinate information of each of the plurality of layers is changed according to the rotation of the electronic device.

26. The non-transitory computer-readable recording medium of claim 25, wherein the method executed by the computer further comprises:
determining whether a coordinate of the changed at least one layer matches a coordinate of the layer rotated in response to the sensed rotation; and
if the coordinates of the changed at least one layer and the layer rotated in response to the sensed rotation do not match, matching the coordinate of the at least one layer with the coordinate of the layer rotated in response to the sensed rotation.

27. The non-transitory computer-readable recording medium of claim 26, wherein the method executed by the computer further comprises, if the coordinates of the changed at least one layer and the layer rotated in response to the sensed rotation do match, displaying an application including another layer having a controlled coordinate.

* * * * *